Patented Nov. 21, 1939

2,180,535

UNITED STATES PATENT OFFICE 2,180,535

METHOD OF MAKING VARNISHES HAVING HIGH PARAFFIN HYDROCARBON TOLERANCE AND THE PRODUCT THEREOF

Evart E. Mayfield, Elsmere, Del., assignor to Hercules Powder Company, Wilmington, Del., a corporation of Delaware No Drawing. Application December 2, 1937, Serial No. 177,826

16 Claims. (Cl. 134—26)

This invention relates to a method of making a varnish from a paraffin hydrocarbon-insoluble resin derived from pine wood which has a high volatile paraffin hydrocarbon tolerance, and to the varnish so made.

The paraffin hydrocarbon-insoluble resin, which is a complex resinous material whose composition is not exactly known, is obtained from pine wood by extraction of comminuted pine wood with a coal tar hydrocarbon. Removal of the volatile substances from such an extract produces a mixture of solid resins, and when this resin mixture is extracted with a volatile paraffin hydrocarbon to remove rosin therefrom, a paraffin hydrocarbon-insoluble resin, substantially free from rosin is recovered. For many years this product was considered practically valueless commercially and was accordingly discarded.

It has been found, however, that among other uses, it is possible to formulate varnishes from this pine wood-derived paraffin hydrocarbon-insoluble resin, drying oils, such as, for example, linseed oil, China-wood oil, etc., driers and solvent thinners. In order to formulate such varnishes in the prior art, however, it has been necessary to use special solvents, such as hydrogenated petroleum solvents or aromatic hydrocarbon solvents to obtain the proper working consistency. It has been impossible heretofore especially with varnishes of less than 25-gallon oil length to thin the varnishes made from this paraffin hydrocarbon-insoluble pine wood resin to any substantial degree with solvents composed solely of volatile paraffin hydrocarbons.

Now, I have found that I may prepare varnishes containing the aforesaid paraffin hydrocarbon-insoluble resin derived from pine wood, by a process which substantially increases the volatile paraffin hydrocarbon tolerance. More particularly I have found that this increased tolerance for paraffin hydrocarbons is obtained by incorporating certain amounts of certain metals during the cooking of the aforementioned resin with drying oils, semi-drying oils or synthetic drying oils.

In proceeding in accordance with my invention, the paraffin hydrocarbon-insoluble resin derived from pine wood and a drying oil, a semi-drying oil, or a synthetic drying oil are heated to a temperature of about 565° F. to about 600° F. and held at that temperature for the proper body, determined in ways well known to those skilled in the art. The metal or combination of metals in suitable form, as more fully described below, are preferably added on the up-heat at a temperature of approximately 500° F. When the properties of the varnish are those desired for any particular purpose, heating is discontinued, the varnish allowed to cool and reduced with volatile diluents to the desired consistency at a temperature from about 450° F. to about 475° F. It will be understood that this latter temperature range is in no way critical, because it is possible to thin at higher or lower temperatures depending upon the particular conditions existing.

In order to obtain the best results, however, I have found that it is necessary to make some changes in the general cooking procedure given above. The paraffin hydrocarbon-insoluble resin derived from pine wood is not soluble in vegetable or animal oils, with the exception of castor oil, at ordinary temperatures. When heated to a temperature of about 565° F. to 600° F., however, the aforesaid resin and oils become miscible and can be thinned with aromatic hydrocarbons or hydrogenated petroleum solvents. Even with such thinners, however, there is frequent precipitation of the resin from the varnish during storage. The undesirability of this is of course very apparent.

After considerable experimental work, a cooking procedure was developed which prevents any resin precipitation from the finished varnish during storage. This cooking procedure is essentially as follows: 100 pounds of the paraffin hydrocarbon-insoluble resin derived from pine wood are placed in a varnish kettle and to this are added from about 2 to about 7 gallons of oil, preferably about 5 gallons of oil. This mixture is then heated to a temperature of about 565° F. to about 600° F., preferably from about 570° F. to about 575° F. and held at that temperature until foaming subsides, which will usually be from about 5 to 10 minutes. When certain metals are added to increase the paraffin hydrocarbon tolerance in accordance with my invention this will preferably be done at the point above where the temperature has reached about 480° F. to about 500° F. After this initial cooking with only part of the oil, which is the essential part of the new cooking procedure, further quantities of oil may then be added to produce any oil length desired and the whole then again heated to about 565° F.–600° F., preferably to about 570° F.–575° F. and held there until the desired body is obtained. It is then allowed to cool to a temperature, preferably, although not necessarily, of about 450° F.–475° F.

and thinned to the desired working consistency with petroleum diluents.

Among the paraffin hydrocarbon diluents, which I may use for thinning my varnishes, are any of the petroleum diluents commonly used in the art, known under various trade names, and familiar to those skilled in the art.

I have determined from a large number of varnishes prepared in the general manner indicated above that the most suitable metals to use to substantially increase the volatile paraffin hydrocarbon tolerance of a varnish containing a paraffin hydrocarbon-insoluble resin derived from pine wood, are lead, manganese, cobalt, zinc and tin, introduced either singly, or as mixtures of two or more of these metals in a suitable form thereof, as more fully described below. I have found that when using mixtures of these metals, smaller amounts of each may be used than when using them alone.

Some of the metals introduced during the cooking procedure are of that class which promote drying of unsaturated oils and, therefore, varnishes prepared as above will have drying properties depending upon the particular metals introduced and the amounts thereof. It is to be distinctly understood, however, that the incorporation of these metals during the cooking procedure is not for the purpose primarily of producing varnishes which have the desired drying qualities but, in accordance with my invention, for the purpose of making varnishes, containing a paraffin hydrocarbon-insoluble resin derived from pine wood, which have a substantially greater tolerance for paraffin hydrocarbon type diluents. I have found, for example, that zinc and tin have little or no effect on the drying of a varnish prepared from the above mentioned resin, yet from the standpoint of producing paraffin hydrocarbon-tolerance thereof, they operate very satisfactorily. The customary procedure for introducing these metals is in the form of various compounds thereof which have a substantial reactivity in the resin-oil mixtures at the temperatures of cooking and thus make the metal available to perform its function of increasing the paraffin hydrocarbon tolerance of a paraffin hydrocarbon-insoluble pine wood resin, drying oil, semi-drying or synthetic drying oil varnish. These metals may be introduced in the form of suitable compounds thereof, among which are, for example, lead as litharge, manganese as manganese dioxide, cobalt as cobalt resinate, zinc as zinc oxide or zinc acetate and tin as stannous chloride. It will be understood that these salts are by way of example only and that I am not limited to the use of these metals in the combinations above given in practicing my invention.

On the basis of thinning a varnish to 50% non-volatile content, 25 gallon oil length varnishes or higher can be thinned solely with paraffin hydrocarbons, liquid at ordinary temperatures, without the addition of any metals, using only the modified cooking procedure before given. If lower non-volatile contents are necessary, however, it will be found that even these higher oil length varnishes must be cooked with the metals before mentioned. For varnishes with oil lengths from 12 gallons to less than 25 gallons, thinning to 50% non-volatile cannot be done with paraffin type hydrocarbons alone, unless the metals before mentioned are incorporated therein during the cooking procedure. For varnishes less than 12 gallons oil length, although the paraffin hydrocarbon tolerance is increased considerably by metal additions, it will be found that some aromatic hydrocarbon type solvents will be necessary, if it is desired to thin the varnish to the usual working consistency. The marked improvement in paraffin hydrocarbon tolerance is most apparent in the range from about 12 gallons to less than 25 gallons oil length, in which range it has not been possible heretofore, to use only petroleum type thinners for dilution. Regardless of the oil length varnish, however, the addition of the metals before mentioned substantially increases the paraffin hydrocarbon tolerance of a varnish containing an oil of the groups above mentioned and a paraffin hydrocarbon-insoluble resin derived from pine wood.

The mechanism whereby these metals perform this function is unknown. That a resin which is substantially completely insoluble in paraffin hydrocarbons can be treated by a simple cooking procedure in making a varnish which is compatible with such solvents is, as far as I am aware, a completely new and unexpected result.

I have found that the minimum quantity of metal as free metal, that is, not combined, on the basis of the oil present in the varnish, which is necessary to produce this increased tolerance of the aforesaid resin-oil varnish for paraffin hydrocarbon diluents, is as follows:

| | Per cent |
|---|---|
| Lead, about | 2½ |
| Manganese, about | 0.4 |
| Cobalt, about | 0.6 |
| Zinc, about | 0.5 |
| Tin, about | 0.5 |
| A lead-manganese combination: | |
| Lead, about | 1.0 |
| Manganese | 0.1 |
| A lead-cobalt combination: | |
| Lead, about | 1.0 |
| Cobalt, about | 0.1 |

The maximum quantity of metal which may be incorporated is not a fixed amount but obviously will be limited in the practical adaptation of my invention by cost, reactivity of the metal with the varnish, and various other factors. In the following table, I show the ranges of the metals and the mixtures as shown above, which have been found satisfactory for most practical purposes. As indicated before, however, in practicing my invention it will be understood that I am not limited to the maximum quantity shown and may exceed this if a particular substance indicates such a procedure. Here, as before, the amounts shown are on the basis of the oil present in the varnish.

| | Per cent |
|---|---|
| Lead | 2½ to 5.0 |
| Manganese | 0.4 to 0.8 |
| Cobalt | 0.6 to 1.0 |
| Zinc | 0.5 to 1.0 |
| Tin | 0.5 to 1.0 |
| Lead-manganese: | |
| Lead | 1.0 to 5.0 |
| Manganese | 0.1 to 0.5 |
| Lead-cobalt: | |
| Lead | 1.0 to 5.0 |
| Cobalt | 0.1 to 0.5 |

From the standpoint of increasing the tolerance of my varnishes for volatile paraffin hydrocarbons and simultaneously produce satisfactory drying qualities, I have found that the lead-manganese composition is to be preferred.

Having now indicated in a general way the procedure in accordance with my invention, I will now proceed to a more detailed description thereof with reference to the following examples.

Example I

One hundred pounds of the paraffin hydrocarbon-insoluble resin derived from pine wood and 5 gallons of China-wood oil are placed in a suitable reaction vessel, such as, for example, a varnish kettle, and the temperature raised to about 480° F.–500° F. at which time 6 pounds of litharge and ¾ pound of manganese dioxide are added thereto and the temperature of the mixture raised to about 575° F. It is held at that temperature until foaming subsides and then an additional 15 gallons of China-wood oil are added and the temperature is then again raised to about 565° F. The mixture is held at that temperature until a string from glass is obtained, a method well known to those skilled in the art. The temperature of the reaction mass is then lowered by adding 5 gallons of additional China-wood oil and when it has cooled to a temperature preferably of about 450° F.–475° F. it is reduced with 60 gallons of a petroleum naphtha having, for example, a boiling range from about 300° F. to about 400° F. Any petroleum type diluent ordinarily used in the varnish industry can, of course, be used instead.

After thinning, as above, a varnish is obtained having a non-volatile content of about 43% and which can be used as such where a varnish is required which, when hardened, by air drying, force drying or baking leaves a film possessing the qualities of toughness, good adhesion and excellent resistance to water, acids, alkalies and oils.

Example II

The increase in the petroleum diluent tolerance of paraffin hydrocarbon-insoluble resin derived from pine wood-oil varnishes cooked both with and without the metal compounds above mentioned, is clearly brought out by the results shown below. Varnishes were made in accordance with the procedure heretofore outlined, using various quantities of linseed ol and thinned in each case to a non-volatile content of 50%. For this work a lead-manganese combination was chosen, consisting of 3% lead and 0.2% manganese on the basis of the oil present, the lead and manganese being incorporated, in the manner indicated before in the form of litharge and manganese dioxide respectively. The results obtained after thinning are shown below.

| Oil length gallons | Lead | Manganese | Petroleum hydrocarbon B. R. 300° F.–400° F. | Toluene | Remarks |
| --- | --- | --- | --- | --- | --- |
| | Percent | Percent | Percent | Percent | |
| 20 | None. | None. | 100 | | Resin. Separates. |
| 20 | None. | None. | 90 | 10 | Do. |
| 20 | None. | None. | 80 | 20 | Compatible. |
| 20 | 3.0 | 0.2 | 100 | | Do. |
| 15 | None. | None. | 100 | | Resin. Separates. |
| 15 | None. | None. | 60 | 40 | Do. |
| 15 | None. | None. | 50 | 50 | Compatible. |
| 15 | 3.0 | 0.2 | 100 | | Do. |
| 12.5 | 3.0 | 0.2 | 100 | | Do. |

The above data clearly indicate the increased tolerance, for a paraffin hydrocarbon type diluent, of a varnish made from linseed oil and a paraffin hydrocarbon-insoluble resin derived from pine wood, which contains a metal combination cooked into the varnish during its manufacture, over a similar varnish cooked in the same way but without any metal content.

The linseed oil used in the above varnishes may be replaced by any of the drying or semi-drying oils among which are, for example, China-wood oil, perilla oil, fish oils, soya bean oil as well as the more recently developed synthetic drying oils.

Similarly, the lead-manganese mixture above shown may be replaced by a different percentage mixture of these metals, or by the single metals or various mixtures of these, in amounts as previously shown.

It will be understood that the examples given herein are by way of illustration only and that the scope of my invention is not limited thereto.

What I claim and desire to protect by Letters Patent is:

1. The method of making a varnish, containing a paraffin hydrocarbon-insoluble resin derived from pine wood, having a substantial tolerance for a paraffin hydrocarbon, liquid at ordinary temperatures, which includes the step of cooking together at a temperature from about 565° F. to about 600° F. said resin, an oil selected from the group consisting of drying oils and semi-drying oils and a compound of a metal selected from the group consisting of zinc, lead, tin, manganese, cobalt, and mixtures thereof, said compound being characterized by substantial reactivity with the oil-resin mixture at temperatures of cooking.

2. The method of making a varnish, containing a paraffin hydrocarbon-insoluble resin derived from pine wood, having a substantial tolerance for a paraffin hydrocarbon, liquid at ordinary temperatures, which includes the step of cooking together at a temperature from about 565° F. to about 600° F. for a period of time necessary to give the desired body to the varnish, said resin, a drying oil and a compound of a metal selected from the group consisting of zinc, lead, tin, manganese, cobalt and mixtures thereof, said compound being characterized by substantial reactivity with the oil-resin mixture at the temperatures of cooking.

3. The method of making a varnish, containing a paraffin hydrocarbon-insoluble resin derived from pine wood, having a substantial tolerance for a paraffin hydrocarbon, liquid at ordinary temperatures, which includes the step of cooking together at a temperature from about 565° F. to about 600° F. for a period of time necessary to give the desired body to the varnish, said resin, a semi-drying oil and a compound of a metal selected from the group consisting of zinc, lead, tin, manganese, cobalt and mixtures thereof, said compound being characterized by substantial reactivity with the oil-resin mixture at the temperatures of cooking.

4. The method of making a varnish, containing a paraffin hydrocarbon-insoluble resin derived from pine wood, having a substantial tolerance for a paraffin hydrocarbon, liquid at ordinary temperatures, which includes the step of cooking together at a temperature from about 565° F. to about 600° F. for a period of time necessary to give the desired body to the varnish, said resin, a synthetic drying oil and a compound of a metal selected from the group consisting of zinc, lead, tin, manganese, cobalt and mixtures thereof, said compound being characterized by substantial reactivity with the oil-resin mixture at the temperatures of cooking.

5. The method of making a varnish, containing a paraffin hydrocarbon-insoluble resin derived from pine wood, having a substantial tolerance for a paraffin hydrocarbon, liquid at ordinary temperatures, which includes the step of cooking together at a temperature from about 565° F. to about 600° F. for a period of time necessary to give the desired body to the varnish, said resin, China-wood oil and a compound of a metal selected from the group consisting of zinc, lead, tin, manganese, cobalt and mixtures thereof, said compound being characterized by substantial reactivity with the oil-resin mixture at the temperatures of cooking.

6. The method of making a varnish, containing a paraffin hydrocarbon-insoluble resin derived from pine wood, having a substantial tolerance for a paraffin hydrocarbon, liquid at ordinary temperatures, which includes the step of cooking together at a temperature from 565° F. to about 600° F. for a period of time necessary to give the desired body to the varnish, said resin, soya bean oil and a compound of a metal selected from the group consisting of zinc, lead, tin, manganese, cobalt and mixtures thereof, said compound being characterized by substantial reactivity with the oil-resin mixture at the temperatures of cooking.

7. The method of making a varnish, containing a paraffin hydrocarbon-insoluble resin derived from pine wood, having a substantial tolerance for a paraffin hydrocarbon, liquid at ordinary temperatures, which includes the step of cooking together at a temperature from about 565° F. to about 600° F. for a period of time necessary to give the desired body to the varnish, said resin, China-wood oil and a mixture of litharge and manganese dioxide such that from about 1% to about 5% lead and from about 0.1% to about 0.5% manganese, as free metal respectively, of the weight of said oil, are present.

8. The method of making a varnish, containing a paraffin hydrocarbon-insoluble resin derived from pine wood, having a substantial tolerance for a paraffin hydrocarbon, liquid at ordinary temperatures, which includes the step of cooking together at a temperature from about 565° F. to about 600° F. for a period of time necessary to give the desired body to the varnish, said resin, soya bean oil and a mixture of litharge and manganese dioxide such that from about 1% to about 5% lead and from about 0.1% to about 0.5% manganese, as free metal respectively, of the weight of said oil, are present.

9. The method of making a varnish, containing a paraffin hydrocarbon-insoluble resin derived from pine wood, having a substantial tolerance for a paraffin hydrocarbon, liquid at ordinary temperatures, which includes the step of cooking together at a temperature from about 565° F. to about 600° F. for a period of time necessary to give the desired body to the varnish, said resin, an oil selected from the group consisting of drying oils and semi-drying oils and an amount of a zinc compound, reactive with the oil-resin mixture at cooking temperatures, such that from about 0.5% to about 1% zinc, as free metal, on the basis of the oil, is present.

10. The method of making a varnish, containing a paraffin hydrocarbon-insoluble resin derived from pine wood, having a substantial tolerance for a paraffin hydrocarbon, liquid at ordinary temperatures, which includes the step of cooking together at a temperature from about 565° F. to about 600° F. for a period of time necessary to give the desired body to the varnish, said resin, an oil selected from the group consisting of drying oils and semi-drying oils and an amount of a manganese compound, reactive with the oil-resin mixture at cooking temperatures, such that from about 0.4% to about 0.8% manganese, as free metal, on the basis of the oil, is present.

11. The method of making a varnish, containing a paraffin hydrocarbon-insoluble resin derived from pine wood, having a substantial tolerance for a paraffin hydrocarbon, liquid at ordinary temperatures, which includes the step of cooking together at a temperature from about 565° F. to about 600° F. for a period of time necessary to give the desired body to the varnish, said resin, an oil selected from the group consisting of drying oils and semi-drying oils and a mixture of a lead compound and a manganese compound, reactive with the oil-resin mixture at cooking temperatures, such that from about 1% to about 5% lead and from about 0.1% to about 0.5% manganese, as free metal respectively, of the weight of oil, are present.

12. A varnish comprising a paraffin hydrocarbon which is liquid at ordinary temperatures and the product obtained by reacting a substantially paraffin hydrocarbon-insoluble resin derived from pine wood, an oil selected from the group consisting of drying oils and semi-drying oils and a compound of a metal selected from the group consisting of zinc, lead, tin, manganese, cobalt and mixtures thereof, by the process specified in claim 1.

13. A varnish comprising a paraffin hydrocarbon which is liquid at ordinary temperatures and the product obtained by reacting a substantially paraffin hydrocarbon-insoluble resin derived from pine wood, an oil selected from the group consisting of drying oils and semi-drying oils and a compound of a metal selected from the group consisting of zinc, lead, tin, manganese, cobalt and mixtures thereof by the process specified in claim 1, the said varnish having an oil length within the range of about 12 gallons to about 25 gallons.

14. A varnish comprising a paraffin hydrocarbon which is liquid at ordinary temperatures and the product obtained by reacting a substantially paraffin hydrocarbon-insoluble resin derived from pine wood, an oil selected from the group consisting of drying oils and semi-drying oils and a compound of zinc by the process and in the amounts specified in claim 9.

15. A varnish comprising a paraffin hydrocarbon which is liquid at ordinary temperatures and the product obtained by reacting a substantially paraffin hydrocarbon-insoluble resin derived from pine wood, an oil selected from the group consisting of drying oils and semi-drying oils and a manganese compound by the process and in the amounts specified in claim 10.

16. A varnish comprising a paraffin hydrocarbon which is liquid at ordinary temperatures and the product obtained by reacting a substantially paraffin hydrocarbon-insoluble resin derived from pine wood, an oil selected from the group consisting of drying oils and semi-drying oils and a mixture of a lead compound and a manganese compound by the process and in the amounts specified in claim 11.

EVART E. MAYFIELD.